US009952081B2

(12) United States Patent
Staudinger et al.

(10) Patent No.: US 9,952,081 B2
(45) Date of Patent: Apr. 24, 2018

(54) SYSTEM AND METHOD FOR MEASURING LIQUID LEVELS HAVING A FIBER WITH A STRAIN LAYER AROUND A BRAGG GRATING

(71) Applicants: Tyler C. Staudinger, Huntsville, AL (US); Jacob D. Delaney, Madison, AL (US)

(72) Inventors: Tyler C. Staudinger, Huntsville, AL (US); Jacob D. Delaney, Madison, AL (US)

(73) Assignee: THE BOEING COMPANY, Chicago, IL (US)

( * ) Notice: Subject to any disclaimer, the term of this patent is extended or adjusted under 35 U.S.C. 154(b) by 233 days.

(21) Appl. No.: 15/056,856

(22) Filed: Feb. 29, 2016

(65) Prior Publication Data

US 2017/0248460 A1  Aug. 31, 2017

(51) Int. Cl.
*G01F 23/22* (2006.01)
*G01D 5/353* (2006.01)

(52) U.S. Cl.
CPC ......... *G01F 23/22* (2013.01); *G01D 5/35354* (2013.01)

(58) Field of Classification Search
CPC ....... G01F 23/22; G01D 5/35354; G01D 5/38
USPC ........... 250/577, 237 G, 227.14, 227.25, 221
See application file for complete search history.

(56) References Cited

U.S. PATENT DOCUMENTS 5,828,059 A * 10/1998 Udd .................. G01L 1/246
250/227.18

OTHER PUBLICATIONS

A. Othonos and K. Kalli, Fiber Bragg Grating Fundamentals and Applications in Communications and Sensing, Artech House, London (Jun. 1, 1999).
B. H.-J Sheng et al., "A lateral pressure sensor using a fiber Bragg grating," IEEE Photon. Technol. Lett 16(4), 1149-1151, (Apr. 2004).
"Continuous liquid level monitoring sensor system using fiber Bragg grating", Opt. Eng. 53(1), 017102, (Jan. 6, 2014).
D. Chiuchiolo, A.; Bajko, M.; Perez, J.C.; Bajas, H.; Consales, M.; Giordano, M.; Breglio, G.; Cusano, A., "Fiber Bragg Grating Cryosensors for Superconducting Accelerator Magnets," Photonics Journal IEEE, 6, No. 6, pp. 1,10, (Dec. 2014).
Kenneth O. Hill and Gerald Meltz, Fiber Bragg Grating Technology Fundamentals and Overview; Journal of Lightwave Technology, vol. 15, No. 8, (Aug. 1997).

* cited by examiner

*Primary Examiner* — Que T Le
(74) *Attorney, Agent, or Firm* — Toler Law Group, PC (57) ABSTRACT

A level sensor assembly includes a fiber that is configured to be at least partially disposed in a tank and to be coupled to a light source and to a light detector. The fiber includes a plurality of sensing regions spaced apart along a length of the fiber. Each sensing region of the plurality of sensing regions includes a Bragg grating configured to generate a reflection spectrum responsive to incident light and a strain layer around the Bragg grating. Each strain layer is configured to induce a strain on the fiber at a respective Bragg grating based on a temperature of the strain layer such that shifts in the reflection spectra of the Bragg gratings indicate which of the sensing regions are submerged in a liquid.

20 Claims, 8 Drawing Sheets

SYSTEM AND METHOD FOR MEASURING LIQUID LEVELS HAVING A FIBER WITH A STRAIN LAYER AROUND A BRAGG GRATING

FIELD OF THE DISCLOSURE

The present disclosure is generally related to measuring liquid levels.

BACKGROUND

Many technologies exist to measure or track liquid levels in tanks, such as tanks of vehicles, land-based tanks, or sea-based tanks. Examples of such technology include capacitive sensors, diode-based sensors, and differential pressure sensors. Each of these technologies is useful for a particular range of operating conditions. However, measuring the level of certain liquids may pose particular issues. For example, measuring or tracking liquid levels for cryogenically stored liquids can be particularly difficult because of the extreme temperatures involved. Additionally, in certain circumstances, such as with respect to tanks of launch vehicles, the tanks and the level sensors may be subject to significant mechanical stresses as a result of a launch, which may limit which technologies can be used for liquid level sensing in these circumstances.

SUMMARY

In a particular implementation, a level sensor assembly includes a fiber that is configured to be at least partially disposed in a tank and to be coupled to a light source and to a light detector. The fiber includes a plurality of sensing regions spaced apart along a length of the fiber. Each sensing region of the plurality of sensing regions includes a Bragg grating configured to generate a reflection spectrum responsive to incident light and includes a strain layer around the Bragg grating. Each strain layer is configured to induce a strain on the fiber at a respective Bragg grating based on a temperature of the strain layer such that shifts in the reflection spectra of the Bragg gratings indicate which of the sensing regions are submerged in a liquid.

In another particular implementation, a level sensor system includes a fiber. The fiber includes a plurality of Bragg gratings defined along a length of the fiber and a strain layer around each Bragg grating of the plurality of Bragg gratings. The strain layer is configured to induce a strain on the fiber at a respective Bragg grating, where the strain is based on a temperature of the strain layer. The level sensor system also includes a light source coupled to the fiber to cause incident light to propagate along the fiber, a light detector coupled to the fiber, and a control system coupled to the light detector. The control system is configured to receive a signal from the light detector. The signal indicates a detected light spectrum detected by the light detector, where the detected light spectrum differs from a spectrum of the incident light due to reflection characteristics of the plurality of Bragg gratings. The control system is further configured to compare the detected light spectrum to a reference spectrum to detect a shift in a reflection spectrum of at least one Bragg grating of the plurality of Bragg gratings and to determine a level of liquid in a tank based on the shift.

In another particular implementation, a containment system includes a tank and a fiber at least partially disposed within the tank. The fiber includes a plurality of Bragg gratings defined along a length of the fiber and a strain layer around each Bragg grating of the plurality of Bragg gratings. The strain layer is configured to induce a strain on the fiber at a respective Bragg grating, where the strain is based on a temperature of the strain layer. The containment system further includes a control system coupled to the fiber. The control system is configured to determine a level of liquid in the tank based on a shift in a reflection spectrum of at least one Bragg grating of the plurality of Bragg gratings. The shift indicates whether a strain layer of the at least one Bragg grating is in contact with the liquid.

The features, functions, and advantages that have been described can be achieved independently in various implementations or may be combined in yet other implementations, further details of which are disclosed with reference to the following description and drawings.

DETAILED DESCRIPTION

Embodiments disclosed herein include fiber optic level sensors that use Bragg gratings to reflect light along a fiber. Each Bragg grating is surrounded by a strain layer. The strain layer proximate to a particular Bragg grating induces (or changes) strain on the Bragg grating to change the reflective profile of the Bragg grating. To illustrate, under reference conditions, such as standard temperature and pressure, a Bragg grating may have a corresponding reflection peak at a particular frequency or wavelength. When the strain layer induces strain on the Bragg grating, the strain layer may cause the reflection peak to shift to a slightly higher or a slightly lower wavelength. The strain layer may be associated with a different coefficient of thermal expansion than the fiber. Therefore, when the strain layer and the fiber are exposed to a temperature change, the strain layer may induce a strain on the fiber, and consequently, on the Bragg grating. Examples of the strain layer include polymers, such as Polytetrafluoroethylene (PTFE), which is capable of withstanding cryogenic temperatures. Accordingly, the fiber optic level sensor may be used to track the liquid level in a tank that contains cryogenically cooled liquids, such as liquid Hydrogen. Additionally, due to the simplicity of the fiber optic level sensor, the sensor can be used in a variety of environments, including in a tank of a launch vehicle. Further, the fiber optic level sensor may be easily integrated into the tank via a single penetration. The fiber optic level sensor may also be immune to electromagnetic interference (EMI) and may also, due to a lack of electrical components, avoid potential short circuits of any electrical components.

Figure 1:
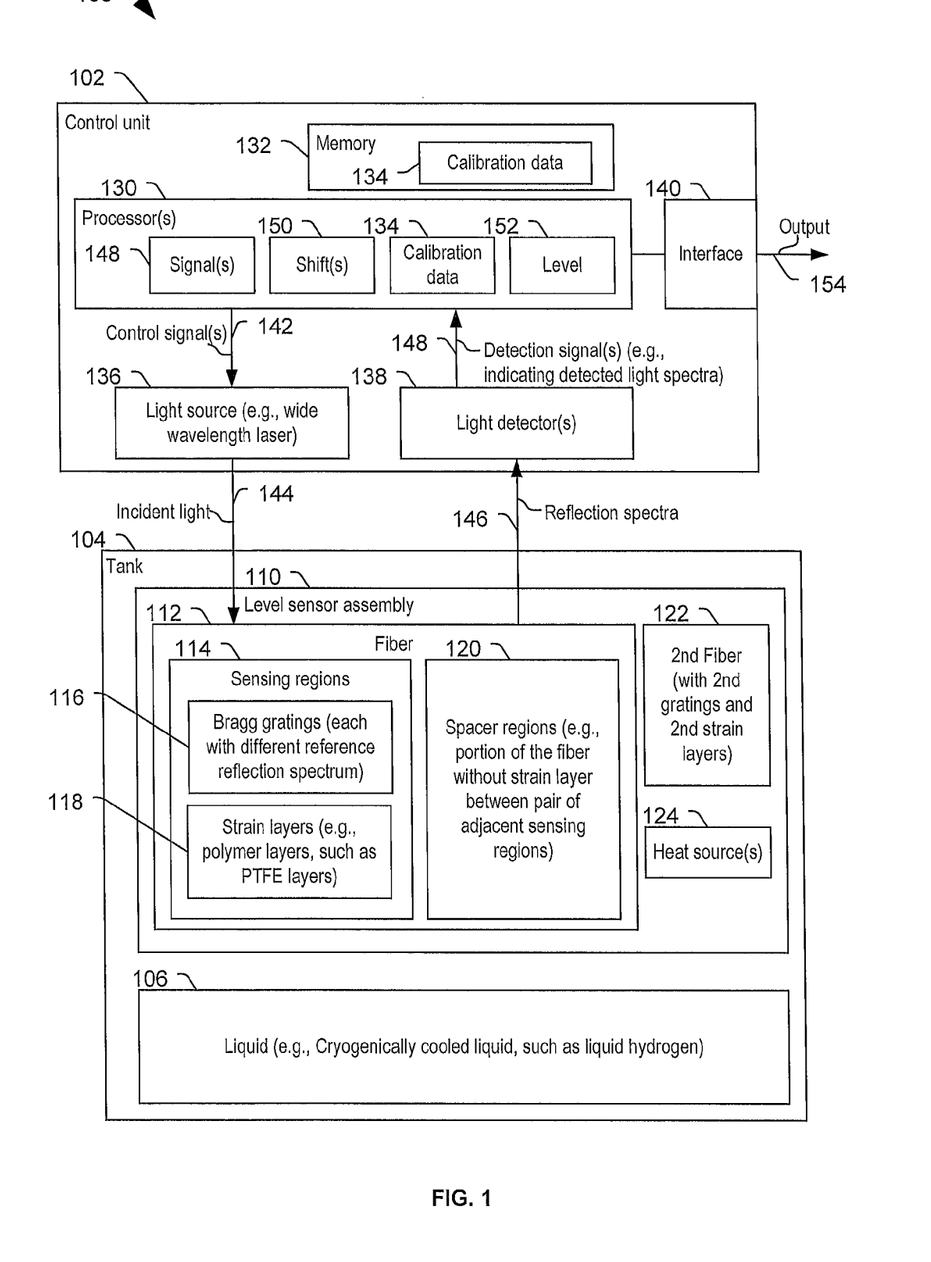
FIG. 1 is a block diagram that illustrates a containment system for measuring liquid levels.

FIG. 1 illustrates a particular embodiment of a containment system 100. The containment system 100 may include or be included within a portion of a vehicle, such as a launch vehicle, an aircraft, a ground-based vehicle, or a ship. Alternatively, the containment system 100 may include or be included within a stationary containment system. The containment system 100 includes a tank 104 and a control unit 102. The control unit 102 is coupled to a level sensor assembly 110 disposed at least partially within the tank 104. The level sensor assembly 110 includes a fiber 112 that includes a plurality of sensing regions 114 and a plurality of spacer regions 120 between the sensing regions 114. Each sensing region 114 includes a Bragg grating 116 and a strain layer 118 surrounding the Bragg grating 116. Thus, the fiber 112 includes a plurality of Bragg gratings 116 surrounded by strain layers 118 separated by spacer regions 120. In some embodiments, the spacer regions 120 do not include strain layers 118 or Bragg gratings 116. In other embodiments, the spacer regions 120 also include the strain layers 118 but do not include Bragg gratings 116.

The tank 104 may be configured to contain a liquid 106. For example, the liquid 106 may include a cryogenically cooled liquid, such as liquid Hydrogen. In this context, cryogenically cooled liquid refers to a material that is in a gas state at standard temperature and pressure (e.g., 0° C. (273.15 K) and $10^5$ pascals (Pa)) and is in a liquid state at a temperature below about −180° C. For example, liquid Hydrogen has a boiling point of about 20 Kelvin (K) at atmospheric pressure (e.g., $10^5$ Pa). Additionally, the level sensor assembly 110 may include one or more additional fibers, such as a second fiber 122. When another fiber is present, the other fiber, such as the second fiber 122, may include second gratings (e.g., that are similar to Bragg gratings 116) and second strain layers (e.g., that are similar to strain layer 118), which may be separated by spacer regions (e.g., that are similar to spacer regions 120).

In some embodiments, the level sensor assembly 110 may optionally include one or more heat sources 124. The one or more heat sources 124 may be positioned proximate one or more of the fibers 112, 122. The one or more heat sources 124 may provide heat to the fibers 112, 122 to increase an amount of heat differential between portions of the fiber that are above a level of the liquid 106 (e.g., first sensing regions of the sensing regions 114) and other portions of the fiber 112 that are below the level of the liquid 106 (e.g., second sensing regions of the sensing regions 114). For example, the second sensing regions of the fiber 112 that are below the level of the liquid 106 may dissipate heat from the one or more heating sources 124 more quickly than the first sensing regions that are above the level of the liquid 106. In another implementation, the one or more heat sources 124 may be integrated within one or more of the fibers 112, 122. For example, one or more infrared (IR) probe lights may be fed into one or more of the fibers 112, 122. In this example, the fibers 112, 122 may be configured to be lossy with respect to the wavelength of the IR probe lights. Thus, the IR probe lights may cause the fibers 112, 122 to generate heat due to losses associated with the IR probe lights.

The control unit 102 may include or be coupled to one or more light sources 136 and one or more light detectors 138. Additionally, the control unit 102 may include one or more processors 130, a memory 132, and an interface 140. The interface 140 may be configured to provide an output 154 to another device, such as another computing device of a control system. For example, the output 154 may indicate a level of the liquid 106 within the tank 104. The memory 132 may include calibration data 134. The calibration data 134 may associate reference reflection peaks to particular positions along the fiber 112, as further described below. The calibration data 134 may be used to determine the output 154 (e.g., the level of the liquid 106 within the tank 104).

The light source 136 may be configured to provide incident light 144 to the fiber 112. For example, the light source 136 may include a laser light source, such as a wide wavelength laser. The wide wavelength laser may be swept over a particular range of wavelengths (e.g., approximately 1460 nanometers to 1620 nanometers) in order to provide a wide range of wavelengths of light to the fiber 112. The Bragg gratings 116 of the fiber 112 may each have a different reference reflection spectrum. For example, when not strained by the strain layer 118, each Bragg grating 116 may generate a respective characteristic reflection peak. The memory 132 may store data (e.g., calibration data 134), that indicates which reflection peak (or range of reflection wavelengths) is associated with each Bragg grating 116. Accordingly, the calibration data 134 may be used to determine a position along the fiber 112 corresponding to each Bragg grating 116 and a reflection peak or range of reflection wavelengths associated with each Bragg grating 116. Thus, by determining shifts of reflection peaks associated with the Bragg gratings, the calibration data 134 may be used to determine a liquid level (e.g., level 152) in the tank 104, as described further below.

The light detectors 138 may be coupled to the fiber 112 to receive reflection spectra 146 from the fiber 112. The light detectors 138 may generate a detection signal or detection signals 148 that are provided to the processors 130. The detection signals 148 may indicate reflective light intensities and corresponding wavelengths of light reflected from the fiber 112. Since each Bragg grating 116 has a corresponding reflection peak, the detection signal 148 may indicate a reflection peak associated with each Bragg grating 116. By comparing the wavelength of each reflection peak to the calibration data 134 at the processor 130, the processor 130 may determine which reflection peaks are shifted, which indicates which Bragg gratings 116 are being subjected to strain by a respective strain layer 118. The processor 130 can determine the level 152 of the liquid 106 in the tank 104 based on which Bragg gratings 116 are subjected to strain.

During operation, the liquid 106 in the tank 104 may attain a particular level. For example, as the tank 104 is filled or emptied, the liquid 106 may have a corresponding level. The light source 136 may provide the incident light 144 to the fiber 112. Each Bragg grating 116 along the fiber may reflect a particular wavelength as a peak or central reflection wavelength. Thus, portions of the incident light 144 transmitted into the fiber 112 may be reflected as the reflection spectra 146. Although each Bragg grating 116 has a characteristic reference reflection spectrum, when a strain layer 118 associated with a particular Bragg grating 116 induces strain on the particular Bragg grating 116, the reflection peak for the particular Bragg grating 116 may shift relative to the reference reflection peak. The shift results in a shifted reflection peak for the particular Bragg grating 116. The strain layer 118 of a particular Bragg grating 116 may induce strain on the Bragg grating due to the strain layer being in contact with the liquid 106. For example, the liquid 106 may be cryogenically cooled. Thus, contact with the cryogenically cooled liquid 106 may induce significant shrinkage of the strain layer 118 as compared to the fiber 112 due to the difference in the coefficient of thermal expansion of the strain layer 118 and the fiber 112. When the strain layer 118 induces strain on the Bragg grating 116, the reflection peak may shift causing a difference in the reflection peak in the reflection spectra 146 detected by the light detectors 138.

The light detectors 138 provide the detection signal 148 to the processor 130. The processor 130 uses the detection signals 148 to determine shifts 150 in the reflection spectra associated with each of the Bragg gratings 116. Those Bragg gratings 116 that have the greatest shift (e.g., greater than a threshold amount of shift) may be determined to be in contact with the liquid 106. Other Bragg gratings may have little or no shift indicating that these Bragg gratings are not in contact with the liquid. By comparing the Bragg gratings associated with significant reflection peak shifts to the calibration data 134, the level of the liquid 106 in the tank 104 may be determined, and an output indicating of the level 152 may be provided via the interface 140 to another device, such as a computing device or a control system.

Figure 2:
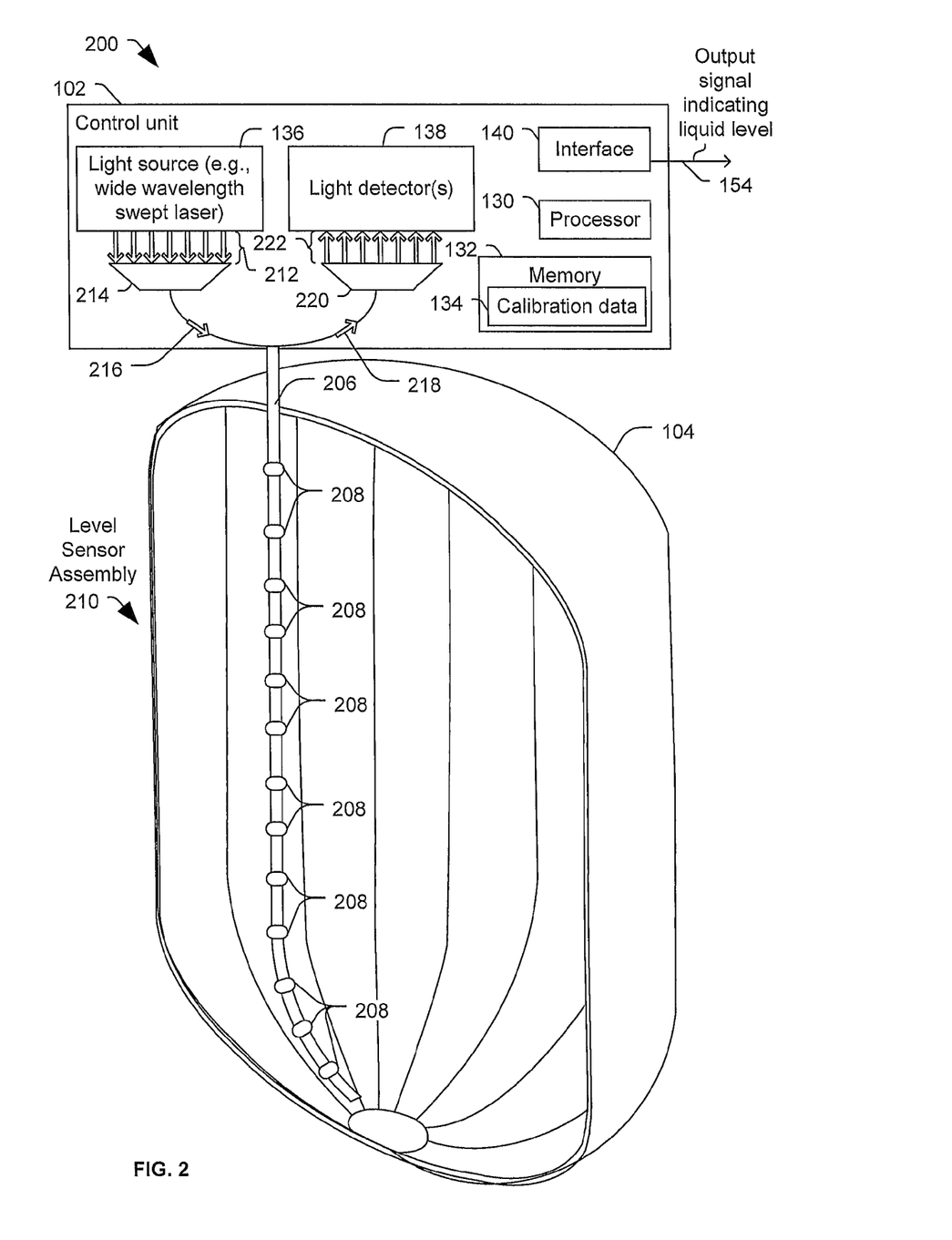
FIG. 2 is a diagram that illustrates a first particular configuration of the containment system of FIG. 1.

FIG. 2 illustrates a first particular embodiment (e.g., the containment system 200) of the containment system 100 of FIG. 1. The containment system 200 is illustrated with more mechanical detail in FIG. 2 to highlight operation of the containment system 200. The containment system 200 includes the control unit 102 and the tank 104. The tank 104 may be configured to store a cryogenically cooled liquid, such as the liquid 106 of FIG. 1. The tank 104 may include a level sensor assembly 210 that is an example of level sensor assembly 110 (shown in FIG. 1). The level sensor assembly 210 may include a fiber 206 having a plurality of sensing regions 208. The sensing regions 208 may be positioned along a length of the fiber 206. Each sensing region 208 may include a Bragg grating within the fiber 206 and a strain layer surrounding the Bragg grating, such as the Bragg gratings 116 and strain layers 118 of FIG. 1. Accordingly, the fiber 206 may be similar to the fiber 112 (shown in FIG. 1).

The control unit 102 may include or be coupled to the light source 136, such as a wide wavelength swept laser, and light detectors 138. The light source 136 may be coupled to or include a multiplexer 214 that receives output light 212 of the light source 136 to generate a wide wavelength incident light input 216 to the fiber 206.

As described with reference to FIG. 1, each sensing region 208 may include a Bragg grating (e.g., Bragg grating 116) with a characteristic reference reflection spectrum. Based on a liquid level in the tank 104, each sensing region 208 may generate a reflection spectrum, which together form reflection spectra 218. The light detectors 138 may include or be coupled to a demultiplexer 220, which receives the reflection spectra 218 and divides the reflection spectra 218 into multiple wavelength regions of interest 222. The wavelength regions of interest 222 are provided to the light detectors 138. Based on the wavelength regions of interest 222, the light detectors 138 generate outputs, such as the detection signals 148 of FIG. 1, which are provided to a processor 130. The processor 130 may be configured generate an output signal 234, via an interface 140, based on the detection signals 148 from the light detectors 138 and the calibration data 134, which is an example of calibration data 134, stored in memory 132, which is an example of memory 132. The output signal 234 includes a signal indicating a liquid level within the tank 104.

Figure 3:
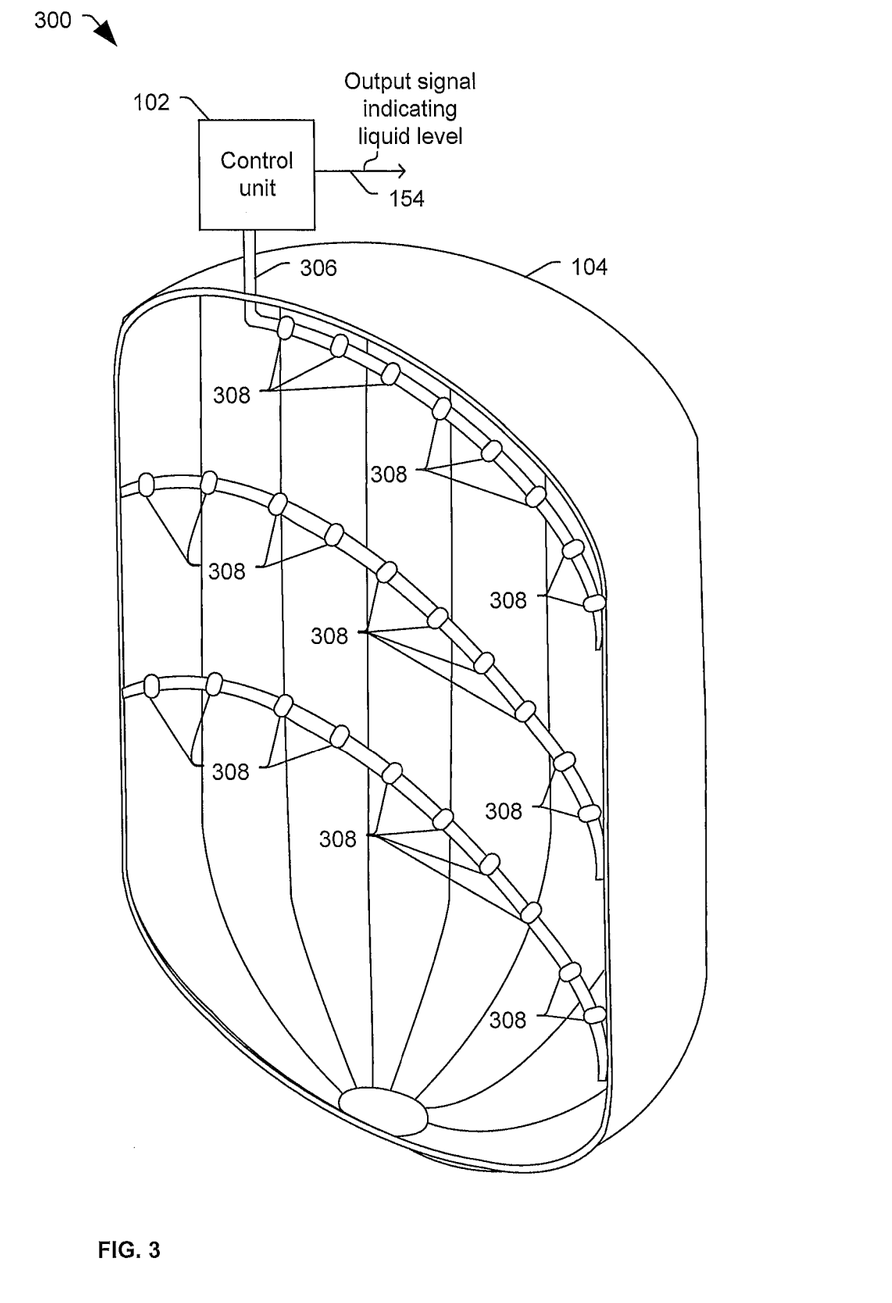
FIG. 3 is a diagram that illustrates a second particular configuration of the containment system of FIG. 1.

FIG. 3 illustrates a second particular embodiment of the containment system 100 of FIG. 1. In the illustration of FIG. 3, a fiber 306 including a plurality of sensing regions 308 is wrapped around an interior wall of the tank 104. The fiber 306 may be similar to fiber 206 (shown in FIG. 2) and is an example of fiber 112 (shown in FIG. 1). The second particular embodiment may be similar to the first particular embodiment shown in FIG. 2, except the fiber 306 may be arranged in a spiral wrapping around the interior wall of the tank 104, rather than along a length of the tank 104 as shown in FIG. 2. A spiral configuration of the fiber 306 in the tank 104 may improve the detection of the liquid level in the tank 104. For example, the spiral configuration may improve detecting the liquid level while the liquid is sloshing within the tank.

Figure 4:
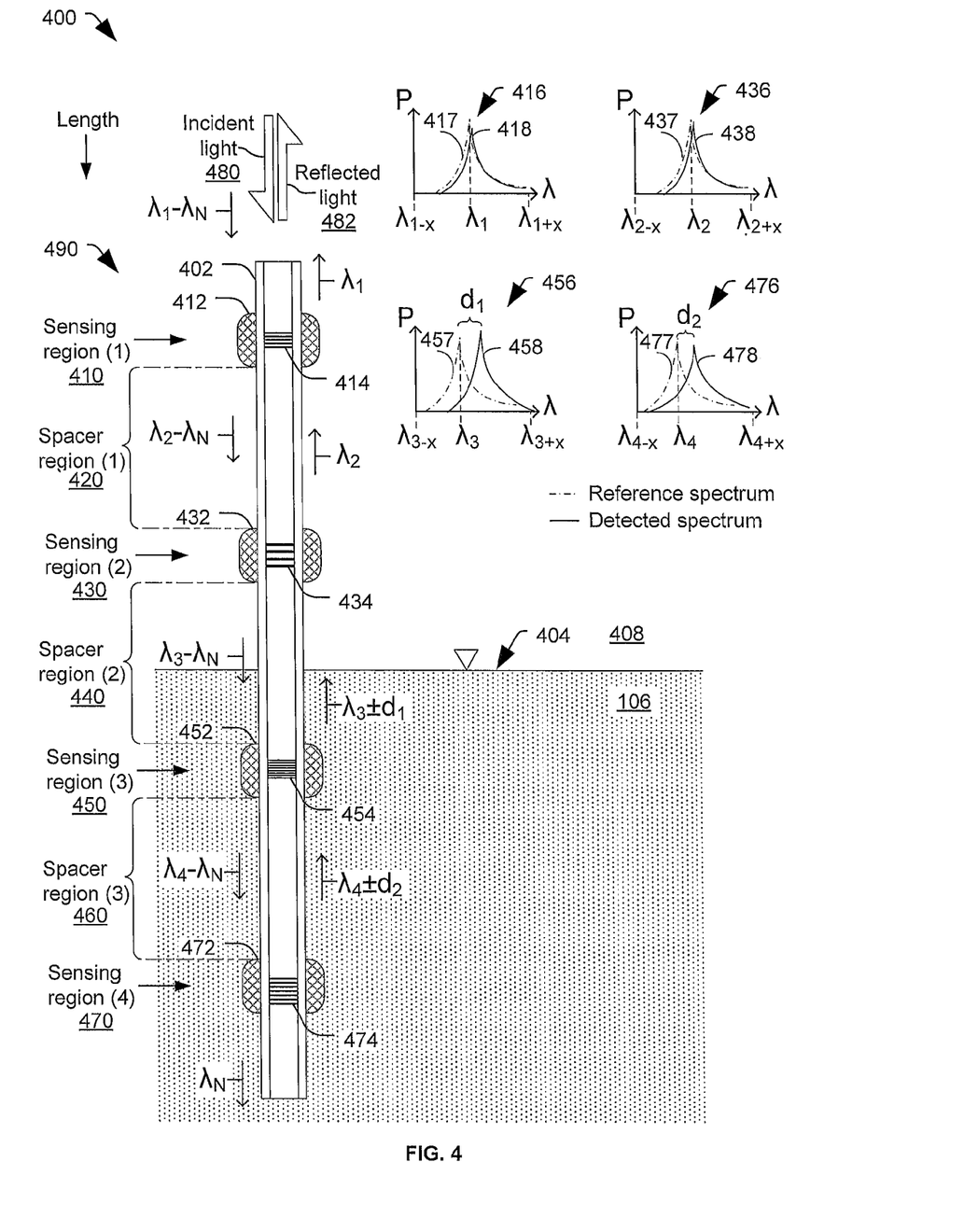
FIG. 4 is a diagram that illustrates a particular embodiment of a level sensor assembly for measuring liquid levels that may be used with the systems shown in FIGS. 1 to 3.

FIG. 4 illustrates a particular embodiment of a sensor assembly 490 that may be used as level sensor assembly 110 (shown in FIG. 1). Sensor assembly 490 includes a fiber 402 having a plurality of sensing regions, such as sensing regions 410, 430, 450, and 470. The fiber 402 may be similar to fiber 306 (shown in FIG. 3) or fiber 206 (shown in FIG. 2) and is an example of fiber 112 (shown in FIG. 1). Although four sensing regions are illustrated in FIG. 4, the sensor assembly 490 may include more than four sensing regions or fewer than four sensing regions depending on the particular configuration. The sensing regions 410, 430, 450, and 470 are arranged along a length of the fiber 402. Each sensing region includes a Bragg grating surrounded by a strain layer. For example, the first sensing region 410 includes a Bragg grating 414 disposed within the fiber 402 and a strain layer 412 surrounding the fiber 402 and the Bragg grating 414. Likewise, the second sensing region 430 includes a Bragg grating 434 within the fiber 402 and a strain layer 432 surrounding the fiber 402 and the Bragg grating 434. Additionally, the third sensing region 450 includes a Bragg grating 454 within the fiber 402 and a strain layer 452 surrounding the fiber 402 and Bragg grating 454. Further, the fourth sensing region 470 includes a Bragg grating 474 within the fiber 402 and a strain layer 472 surrounding the fiber 402 and Bragg grating 474. Sensing regions 410, 430, 450, and 470 may be example of sensing regions 308 shown in FIG. 3, sensing regions 208 shown in FIG. 3, and sensing regions 114 shown in FIG. 1 and may be configured as described above. Similarly, Bragg gratings 414, 434, 454, and 474 may be examples of Bragg grating 116 shown in FIG. 1 and may be configured as described above.

In the particular embodiment illustrated in FIG. 4, the sensing regions 410, 430, 450, 470 are separated by spacer regions. For example, the first sensing region 410 and second sensing region 430 are separated by a first spacer region 420. Additionally, the second sensing region 430 and the third sensing region 450 are separated by a second spacer region 440, and the third sensing region 450 and fourth sensing region 470 are separated by a third spacer region 460. Spacer regions 420, 440, and 460 may be examples of spacer regions 120 shown in FIG. 1 and may be configured as described above. In the embodiment illustrated in FIG. 4, the spacer regions 420, 440, 460 do not include the strain layer or Bragg gratings. However, in other embodiments, spacer regions 420, 440, 460 also include portions of the strain layers but do not include Bragg gratings.

FIG. 4 also illustrates a liquid 106 separated from a gas 408 by a surface 404. The surface 404 therefore corresponds to a surface of the liquid 106.

Incident light 480 may be projected into the fiber 402 from a light source, such as one or more of the light sources 136 of FIG. 1. The incident light 480 may have multiple wavelengths, including a first wavelength $\lambda 1$ through an Nth wavelength $\lambda N$. For purpose of illustration, it is assumed that the first Bragg grating 414 reflects the incident light 480 at a first reference reflection peak corresponding to the first wavelength λ1. Accordingly, reflected light 482 from the fiber 402 includes a first reflection peak at the first wavelength λ1. Portions of the incident light 480 that include a second wavelength λ2 to the Nth wavelength λN continue to propagate through the fiber 402 to the second Bragg grating 434. The second Bragg grating 434 may reflect the incident light 280 (or portions thereof) at a second reference reflection peak corresponding to the second wavelength λ2. Accordingly, the reflected light 482 includes a second reflection peak at the second wavelength λ2 reflected from the second Bragg grating 434. The portions of the incident light 480 that include a third wavelength λ3 through the Nth wavelength λN propagate down the fiber 402 to the third Bragg grating 454. The third Bragg grating 454 may reflect the incident light 480 (or portions thereof) at a third reference reflective peak corresponding to the third wavelength λ3. However, the strain layer 452 induces a strain on the third Bragg grating 454 as a result of contact with the liquid 106. Accordingly, the reflected light 482 includes a reflection peak at the third wavelength λ3 plus or minus a first shift d1. The remaining portions of the incident light 480 propagate down to the fourth Bragg grating 474. The fourth Bragg grating 474 may reflect the incident light 480 (or portions thereof) at a fourth reference reflection peak corresponding to the fourth wavelength λ4. However, the fourth Bragg grating 474 is also submerged and in contact with the liquid 106. Accordingly, the fourth strain layer 472 induces strain on the fourth Bragg grating 474 causing a shift relative to the fourth reference reflection peak. Thus, the reflected light 482 includes a fourth reflection peak at the fourth wavelength λ4 plus or minus a second shift d2.

Reflection peak diagrams 416, 436, 456, and 476 illustrate reflection peaks corresponding to each of the Bragg gratings 414, 434, 454, and 474. Reflection peak diagram 416 corresponds to the first Bragg grating 414, reflection peak diagram 436 corresponds to the second Bragg grating 434, reflection peak diagram 456 corresponds to the third Bragg grating 454, and reflection peak diagram 476 corresponds to the fourth Bragg grating 474. Each of the reflection peak diagrams 416, 436, 456, and 476 may include a corresponding peak detection range within plus or minus a distance x of a reference reflection peak of the respective Bragg grating. A peak detection range may represent a range of wavelengths from which a corresponding reflection peak of a particular Bragg grating is to be detected. Further, the distance x may be selectable based on a number of Bragg gratings included in the fiber 402, a detectable wavelength width, or any combination thereof.

For example, the first reflection peak diagram 416 includes a first peak detection range relative to the first wavelength λ1. The first peak detection range may include wavelengths from λ1−x to λ1+x, and reflection peaks at particular wavelengths within the first peak detection range may be assumed to be reflected by the first Bragg grating 414. For instance, the reflection peak diagram 416 includes a first reference spectrum 417, shown as a dotted line and a first detected spectrum 418, shown as a solid line. The first reference spectrum 417 has a peak at the first wavelength λ1 corresponding to the first Bragg grating 414. Likewise, the first detected spectrum 418 in reflection peak diagram 416 has a reflection peak at or about the first wavelength λ1. Accordingly, the reflection peak diagram 416 indicates that the first Bragg grating 414 (or the first sensing region 410) is not in contact with the liquid 106. The reflection peak diagram 436 shows a second reference spectrum 437 having a reflection peak at wavelength λ2 and a second detected spectrum 438 having a reflection peak at about wavelength λ2, which indicates no shift from the second reference spectrum 437 of the sensing region 430. Thus, the reference peak diagram 436 indicates that the sensing region 430 is not in contact with the liquid 106. The third graph corresponds to the reflection from the sensing region 450. The third reference peak diagram 456 includes a third reference spectrum 457 having reflection peak at wavelength λ3 and a third detected spectrum 458 having a reflection peak between wavelength λ3 and wavelength λ3+x. Accordingly, the third detected spectrum 458 is shifted from the third referenced spectrum 457 peak by the first shift d1. The first shift d1 indicates that the third sensing region 450 is contact with the liquid 106. Likewise, the fourth reference peak diagram 476 shows a second shift d2 between a reflection peak corresponding to a fourth reference spectrum 477 reflection and a reflection peak corresponding to a fourth detected spectrum 478. Thus, the reflection peak diagram 476 indicates that the sensing region 470 is contact with or submerged in the liquid 106.

Accordingly, based on calibration data (e.g., calibration data 134 of FIG. 1 and/or FIG. 2), the level of the surface 404 of the liquid 106 can be determined to be between the second sensing region 430 and the third sensing region 450. Depending on the relative distances between sensing regions, the calibration data may precisely indicate the level of the liquid 106 in the tank. In a particular embodiment, depending on the certain characteristics of the fiber 402 and the light source, approximately 200 Bragg gratings may be formed in the fiber 402 to enable more precise determination of the level of the liquid 406 of the tank, as compared to a fiber having fewer Bragg gratings. Additionally, although the sensing regions 410, 430, 450, 470 are illustrated in FIG. 4 as approximately equally spaced along the fiber 402, in other embodiments, the fiber 402 may include sensing regions that are not all equally spaced apart from one another. For example, sensing regions may be spaced closer to one another (e.g., more densely packed) at some portions of the fiber 402 than at other portions of the fiber 402. The more densely packed sensing regions may provide increased level sensing resolution at an area of interest within the tank.

Figure 5:
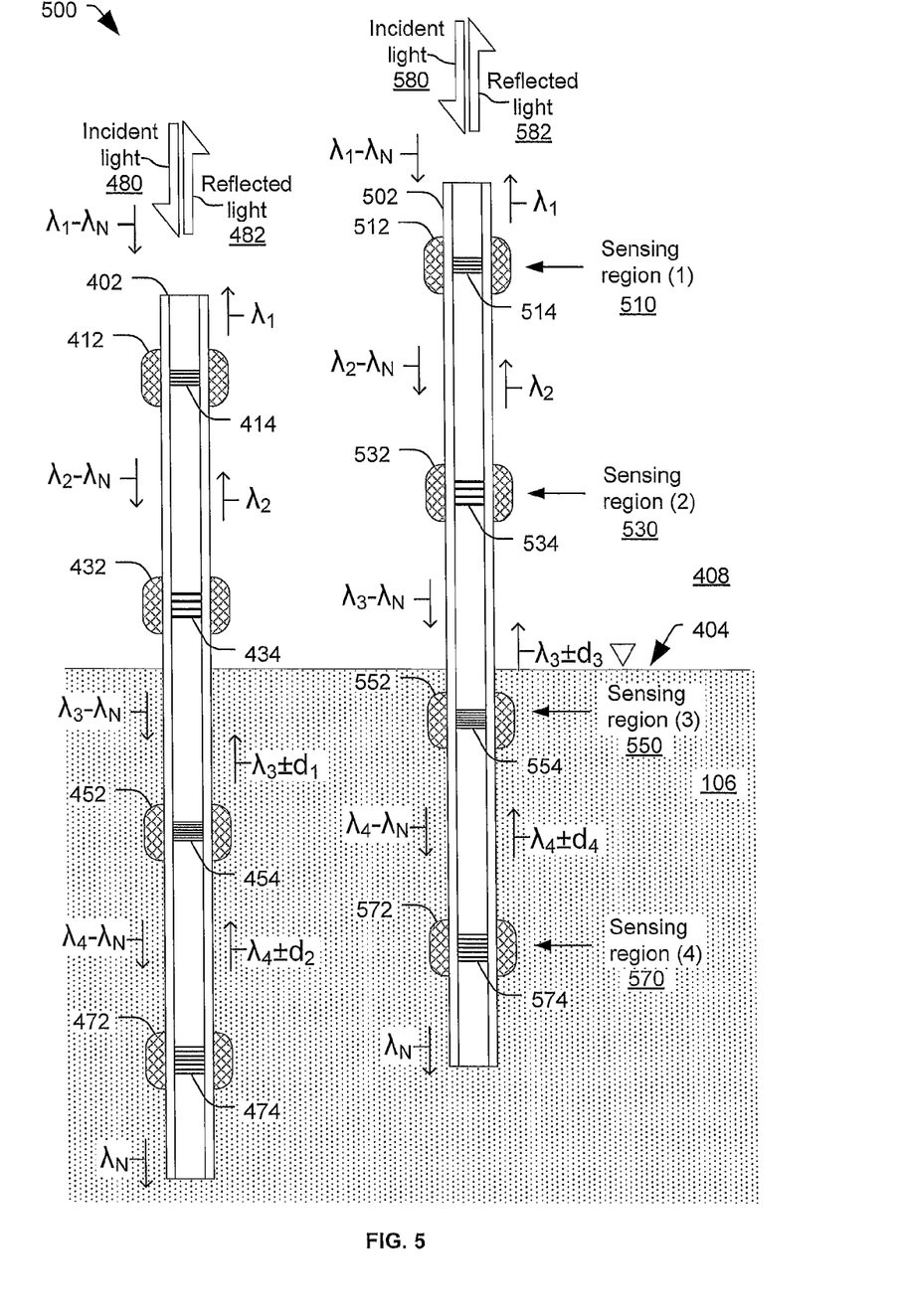
FIG. 5 is a diagram that illustrates another particular embodiment of a level sensor assembly for measuring liquid levels that may be used with the systems shown in FIGS. 1 to 3.

FIG. 5 illustrates another particular embodiment of a level sensor assembly 500 that is similar to level sensor assembly 110 of FIG. 1 and sensor assembly 490 of FIG. 4, except level sensor assembly 500 includes more than one fiber. More specifically, the level sensor assembly 500 of FIG. 5 includes the fiber 402 of FIG. 4 as well as an additional fiber 502. The fiber 502 includes substantially the same features as the fiber 402, such as a plurality of sensing regions, each including Bragg gratings and strain layers disposed along the length of the fiber 502. Additionally, the sensing regions of the fiber 502 are offset from the sensing regions of the fiber 402, such that the sensing region of fiber 502 are at least partially aligned with spacer regions of fiber 402. To illustrate, the fiber 502 includes a first Bragg grating 514 with a corresponding strain layer 512 forming a first sensing region, a second Bragg grating 534 with a corresponding strain layer 532 forming a second sensing region, a third Bragg grating 554 and corresponding strain layer 552 forming a third sensing region, and a fourth Bragg grating 574 and corresponding strain layer 572 forming a fourth sensing region. Bragg gratings 514, 5345, 554, and 574 may be examples of Bragg grating 116 shown in FIG. 1 and may be configured as described above.

As illustrated in FIG. 5, the first sensing region 510 of the fiber 502 is offset from the first sensing region 410 of the fiber 402 along the length of the fibers. Likewise, the second sensing region 530 of the fiber 502 is offset from the second sensing region 430 of the fiber 402. The remaining sensing regions down the length of the fiber 502 are similarly offset from the remaining sensing regions down the length of the fiber 402. Each of the fibers 402, 502 may be configured to receive incident light, such as the incident light 480, having the first wavelength λ1 through the Nth wavelength λN and the incident light 580 having the first wavelength λ1 through the Nth λN wavelength. Although the wavelengths of the incident light 480 and 580 are illustrated as being the same in FIG. 5, in other embodiments, the wavelengths for each fiber 402 and 502 may be different. The embodiment illustrated in FIG. 5 may improve the sensitivity of the level sensor assembly 500, as compared to the level sensor assembly 490 of FIG. 4, by positioning multiple fibers such that their respective sensing regions are offset.

Although the sensing regions of the fiber 402 and the fiber 502 are illustrated as having approximately the same spacing in FIG. 5, in other embodiments the sensing regions of the fiber 402 may have different spacing(s) than the spacing(s) of the sensing regions of the fiber 502. For example, the sensing regions of the fiber 402 may be evenly spaced according to a first spacing distance, and the sensing regions of the fiber 502 may be evenly spaced according to a second spacing distance that is different than the first spacing distance. As another example, the sensing regions of the fiber 402 may be evenly spaced, and the sensing regions of the fiber 502 may be unevenly spaced. In another particular implementation, the sensing regions of the fiber 402 and the sensing regions of the fiber 502 may be unevenly spaced, such that the more densely packed sensing regions of the fiber 402 and the more densely packed sensing regions of the fiber 502 are within approximately the same area of the tank (e.g., tank 104 of FIGS. 1-3). In another particular implementation, the sensing regions of the fiber 402 and the sensing regions of the fiber 502 may be unevenly spaced, such that the more densely packing sensing regions of the fiber 402 and the more densely packed sensing regions of the fiber 502 are within different areas of the tank.

Additionally, although the fiber 402 and the fiber 502 are illustrated as being arranged such that the length of the fiber 402 and the length of the fiber 502 are approximately normal to an expected surface of the liquid 106, in other embodiments, the fiber 402 and the fiber 502 may be arranged differently. For example, the length of the fiber 402 may be arranged approximately normal to the expected surface of the liquid 106 (e.g., such as the arrangement of the fiber 206 of FIG. 2), and the fiber 502 may be arranged in a spiral configuration (e.g., such as the arrangement of the fiber 306 of FIG. 3). As another example, the fiber 402 and the fiber 502 may both be arranged in a spiral configuration.

Further, as discussed above with respect to FIG. 4, the sensor assembly 490 of FIG. 4 detected that the level of the surface 404 of the liquid 106 was between the second sensing region 430 and third sensing region 450 of the fiber 402. By offsetting the sensing regions of the fiber 502 with the sensing regions of the fiber 402, the reflection spectra of the reflected light 582 from the fiber 502 may be used to further refine the measurements of the reflected light from the fiber 402. For example, the reflected light 582 from the second fiber 502 may include a first reflection peak at the first wavelength λ1 corresponding to the first Bragg grating 514, a second reflection peak at the second wavelength λ2 corresponding to the second Bragg grating 534, a third reflection peak (that is shifted a distance d3 from a reflection peak at the third wavelength λ3) corresponding to the third Bragg grating 554, and a fourth reflection peak (that is shifted a distance d4 from a reflection peak at the fourth wavelength λ4) corresponding to the fourth Bragg grating 574. Based on the reflected light 482, as described with reference to FIG. 4, the sensor assembly 490 of FIG. 4 is able to determine that the level of the surface 404 of the liquid 406 is between the second sensing region 430 and third sensing region 450 of the fiber 402.

In FIG. 5, based on the reflected light 582 and corresponding shifts d3 and d4, the sensor assembly 500 of FIG. 5 may determine that the level of the surface 404 is between the second sensing region 530 of the fiber 502 and the third sensing region 550 of the second fiber 502. Thus, the level of the surface 404 may be determined more precisely to be between the level of the third sensing region 550 of the fiber 502 and the level of the second sensing region 430 of the fiber 402. Accordingly, providing additional fibers with separate incident light and reflected light detectors may be used to increase the resolution of the measurements of the sensor assembly 500 of FIG. 5 compared to the measurements of the sensor assembly 490 of FIG. 4. In addition, the additional fibers may provide redundancy in the event of an operational transient associated with the fiber 402.

It will be appreciated that various components FIGS. 1-5 may correspond to each other. For example, FIG. 1 may be a block diagram corresponding to any of the respective embodiments illustrated in FIG. 2-5. For example, the fiber 112 of FIG. 1 may correspond to the fiber 206 of FIG. 2, the fiber 306 of FIG. 3, the fiber 402 of FIG. 4 or the fiber 502 of FIG. 5. Similarly, the sensing regions 114 of FIG. 1 may correspond to the sensing regions 208 of FIG. 2, the sensing regions 308 of FIG. 3, or the sensing regions 410, 430, 450, and 470 of FIG. 4. As another example, the fiber 306 of FIG. 3 may correspond to the fiber 206 of FIG. 2 but in a different configuration.

Figure 6:
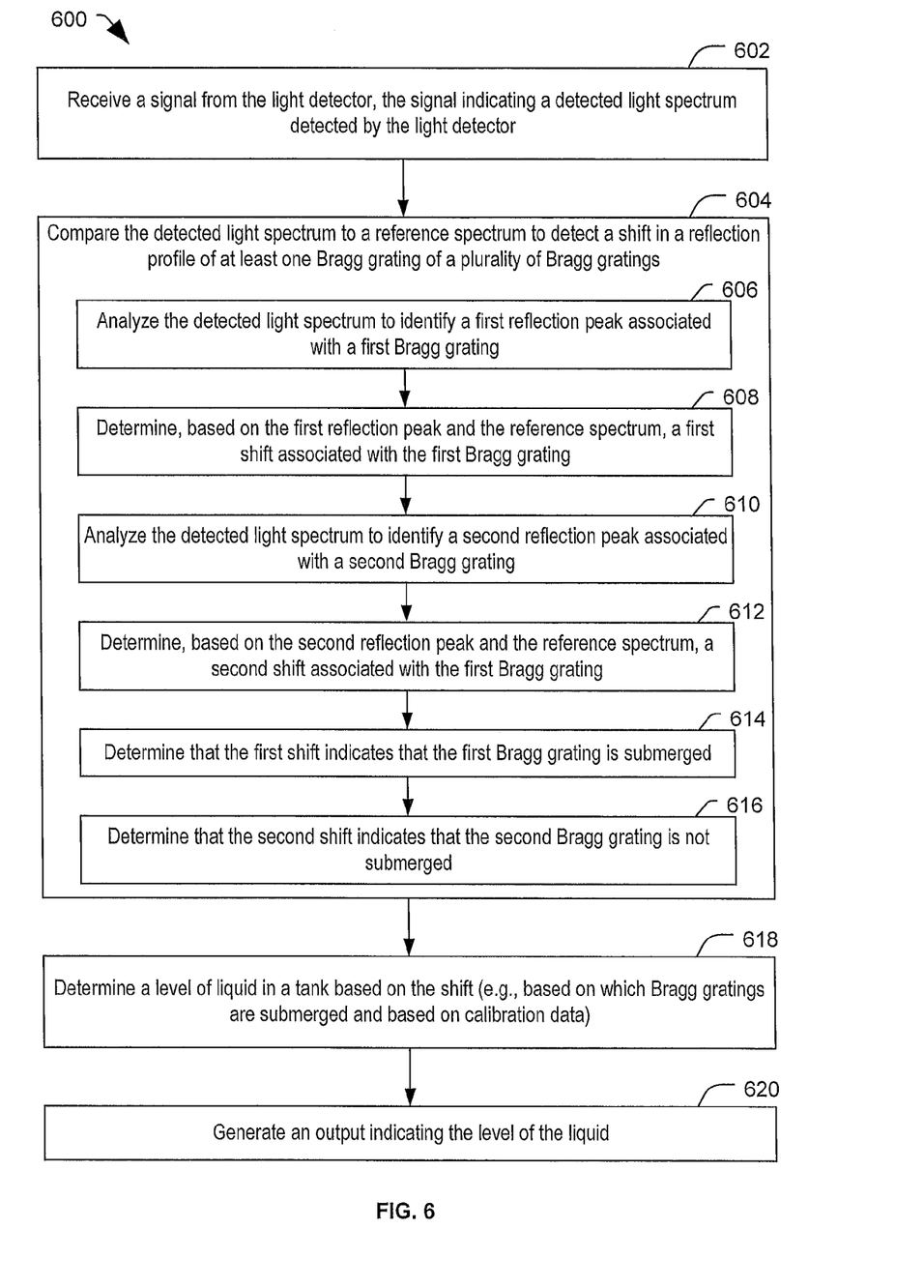
FIG. 6 is a flow chart of an example of a method of measuring liquid levels using the systems and assemblies of FIGS. 1 to 5.

FIG. 6 illustrates a particular example of a method 600 of measuring liquid levels. The method 600 may be performed by the containment systems 100, 200, and 300 of FIGS. 1, 2, and 3, the sensor assemblies 490 and 500 of FIGS. 4 and 5, or a combination thereof.

The method 600 includes, at 602, receiving a signal from a light detector, the signal indicating a detected light spectrum detected by the light detector, where the detected light spectrum differs from a spectrum of an incident light due to reflection profiles of a plurality of Bragg gratings. For example, referring to FIG. 1, one or more light detectors 138 may generate detection signal 148 based on a reflection spectra 146 (caused by reflections of the incident light 144 from the Bragg gratings 116 of the fiber 112). The processor 130 of the control unit 102 may receive the detection signal 148.

The method 600 includes, at 604, comparing the detected light spectrum to a reference spectrum to detect a shift in a reflection profile of at least one Bragg grating of the plurality of Bragg gratings. For example, referring to FIG. 1, reference reflection profiles may be stored as calibration data 134. The reference reflection profiles may indicate the respective reference reflection spectra corresponding to each Bragg grating 116 at a particular set of environmental conditions (e.g., predetermined pressure and temperature). The processor 130 may be configured to compare the reference reflection spectra with the detection signal 148 to determine shifts between the reference reflection spectra and the reflection spectra 146.

In a particular embodiment, comparing the detected light spectrum to the reference spectrum may include, at 606, analyzing the detected light spectrum to identify a first reflection peak associated with a first Bragg grating. The method 600 may also include, at 608, determine, based on the first reflection peak and the reference spectrum, a first shift associated with the first Bragg grating. Referring to FIG. 4, reflection peak diagram 456 illustrates a detected spectrum corresponding to the third Bragg grating 454 that includes a reflection speak associated with a first shift d1.

Comparing the detected light spectrum to the reference spectrum may also include, at 610, analyzing the detected light spectrum to identify a second reflection peak associated with a second Bragg grating, and at 612, determining, based on the second reflection peak and the reference spectrum, a second shift associated with the first Bragg grating. Further, the comparing the detected light spectrum to the reference spectrum may include, at 614, determining that the first shift indicates that the first Bragg grating is submerged, and at 616, determining that the second shift indicates that the second Bragg grating is not submerged. For example, referring to FIG. 4, reflection peak diagram 416 illustrates a detected spectrum corresponding to the first Bragg grating 414 that includes a reflection peak associated with a shift that is within a noise margin (e.g., no shift or a shift less than a threshold). Thus, based on the first shift d1 corresponding to the third Bragg grating 454 and the shift within the noise margin corresponding to the first Bragg grating 414, the third Bragg grating 454 is determined to be submerged in the liquid 106, and the first Bragg grating 414 is determined to be not submerged in the liquid 106.

The method 600 includes, at 618, determining a level of liquid in a tank based on the shift (e.g., based on which Bragg gratings are submerged and based on calibration data). The method 600 includes, at 620, generating an output indicating the level of the liquid. For example, referring to FIG. 1, the processor 130 may communicate with the interface 140 to provide the output 154, which may indicate the level of the liquid 106 in the tank 104.

Figure 7:
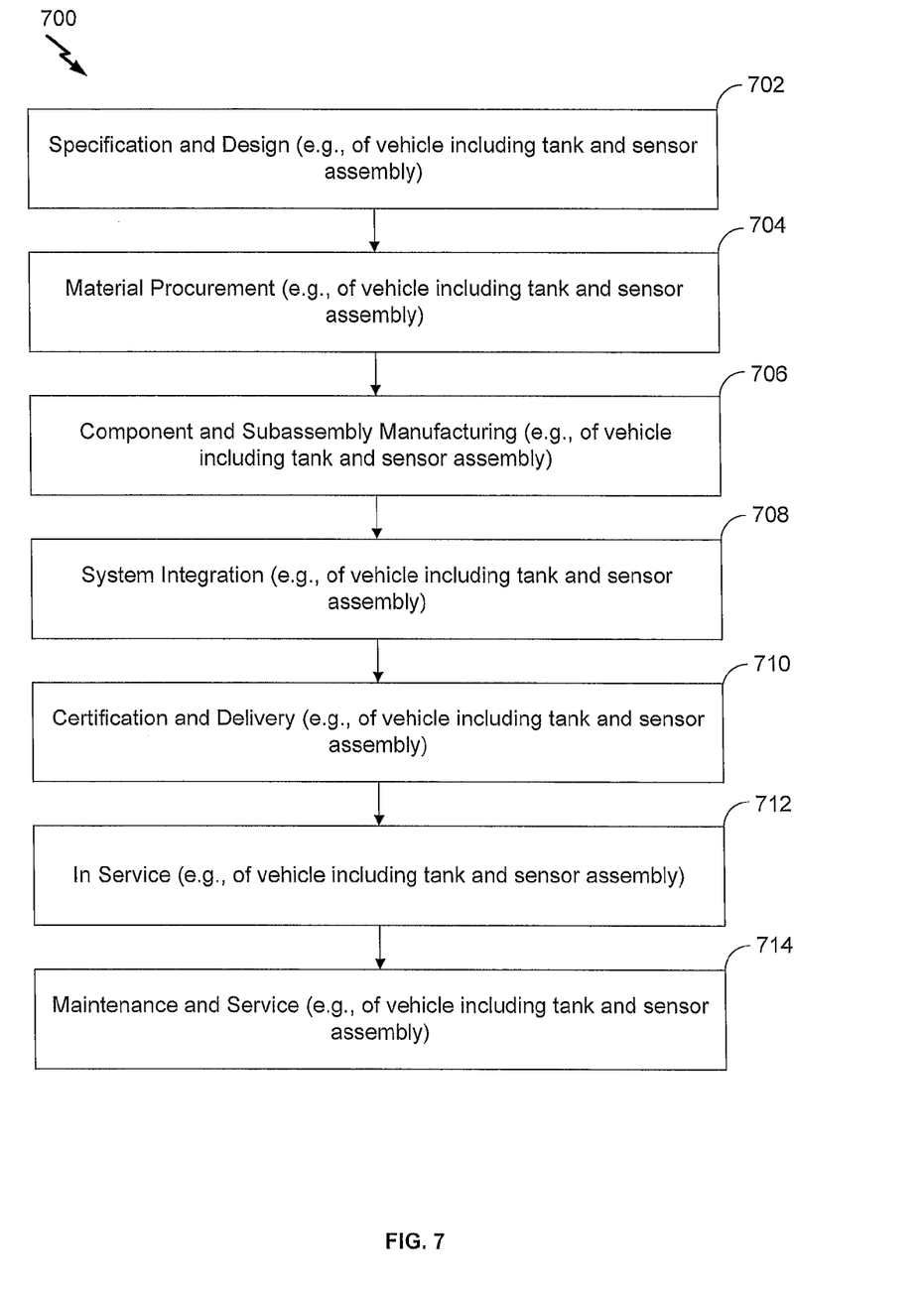
FIG. 7 is a flow chart of an example of a method of operating a system for measuring liquid levels using the systems and assemblies of FIGS. 1 to 5.
Figure 8:
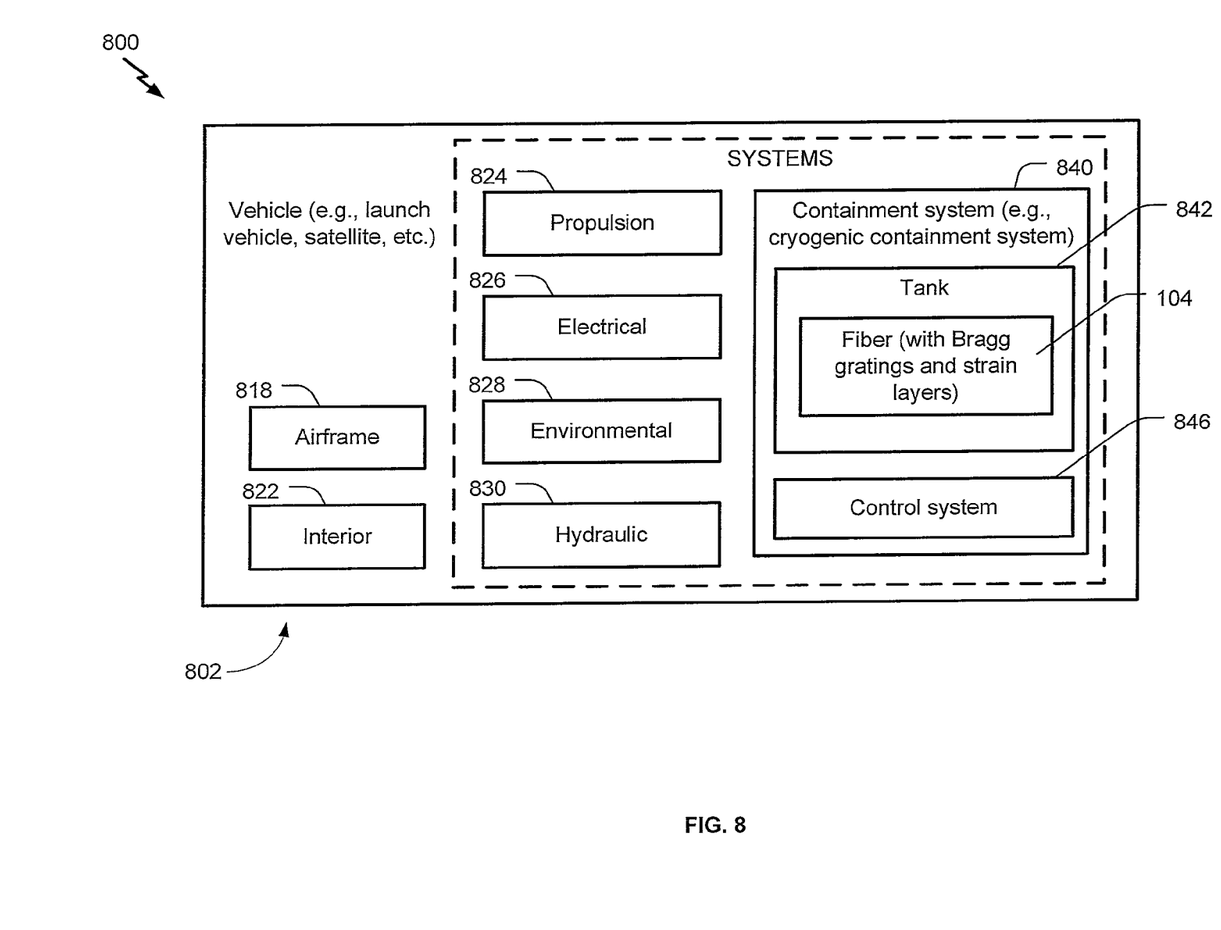
FIG. 8 is a block diagram of an illustrative implementation of a vehicle that includes components of a system for measuring liquid levels as shown in FIGS. 1 to 5.

Referring to FIGS. 7 and 8, examples of the disclosure are described in the context of a vehicle manufacturing and service method 700 as illustrated by the flow chart of FIG. 7 and a vehicle system 800 as illustrated by the block diagram of FIG. 8. A vehicle produced by the vehicle manufacturing and service method 700 of FIG. 7 and a vehicle 802 of FIG. 8 may include aircraft, an automobile, a train, a motorcycle, a bus, a ship or boat, a rocket, a spacecraft, an autonomous vehicle, or another vehicle, as illustrative, non-limiting examples.

Referring to FIG. 7, a flowchart of an illustrative example of a method of operating a system for measuring liquid levels using the systems and assemblies of FIGS. 1 to 5 is shown and designated 700. During pre-production, the exemplary method 700 includes, at 702, specification and design of a vehicle, such as a vehicle that includes the containment system 100 of FIG. 1, the containment system 200 of FIG. 2, the containment system 300 of FIG. 3, the sensor assembly 490 of FIG. 4, the sensor assembly 500 of FIG. 5, and/or a vehicle 802 described with reference to FIG. 8. During the specification and design of the vehicle, the method 700 may include the specification and design of a tank and sensory assembly. The tank may correspond to the tank 104 of FIGS. 1-3. The sensor assembly may correspond to the level sensor assembly 110 of FIG. 1, the sensor assembly 490 of FIG. 4, and/or the sensor assembly 500 of FIG. 5. At 704, the method 700 includes material procurement. For example, the method 700 may include procuring materials (such as the control unit 102, the tank 104, and the level sensor assembly 110 of FIG. 1) for the containment system 100.

During production, the method 700 includes, at 706, component and subassembly manufacturing and, at 708, system integration of the vehicle. The method 700 may include component and subassembly manufacturing (e.g., producing the control unit 102, the tank 104, and the level sensor assembly 110 of FIG. 1) of the system for measuring liquid levels. At 710, the method 700 includes certification and delivery of the vehicle and, at 712, placing the vehicle in service. Certification and delivery may include certifying the containment system 100, 200, 300, 400, and/or 500 for measurement of liquid levels. The method 700 may include placing the system 100, 200, 300, 400, and/or 500 for measuring liquid levels in service. While in service by a customer, the vehicle may be scheduled for routine maintenance and service (which may also include modification, reconfiguration, refurbishment, and so on). At 714, the method 700 includes performing maintenance and service on the vehicle. The method 700 may include performing maintenance and service of the system 100, 200, 300, 490, and/or 500 for measuring liquid levels. For example, maintenance and service of the system for measuring liquid levels may include modifying or replacing one or more components of the tank 104 or sensor assembly 110 of FIG. 1 (e.g., the fiber 112, sensing regions 114, the heating sources 124, or a combination thereof). As another example, maintenance and service of the system may also include upgrading, repairing, or replacing such components.

Each of the processes of the method 700 may be performed or carried out by a system integrator, a third party, and/or an operator (e.g., a customer). For the purposes of this description, a system integrator may include without limitation any number of vehicle manufacturers and major-system subcontractors; a third party may include without limitation any number of venders, subcontractors, and suppliers; and an operator may be an airline, leasing company, military entity, service organization, and so on.

Referring to FIG. 8, a block diagram of an illustrative implementation of a vehicle that includes components of a system for measuring liquid levels is shown and designated 800. For example, the vehicle 802 may include a containment system 840, which may include the containment system 100 of FIG. 1, the containment system 200 of FIG. 2, the containment system 300 of FIG. 3, the sensor assembly 490 of FIG. 4, or the sensor assembly 500 of FIG. 5. To illustrate, the vehicle 802 may include an aircraft, as an illustrative, non-limiting example. The vehicle may have been produced by at least a portion of the method 700 of FIG. 7. As shown in FIG. 8, the vehicle 802 (e.g., an aircraft) may include an airframe 818, an interior 822, and a plurality of systems 820 including a containment system 100, 200 and a control system 846. The containment system 840 may include a tank 104 and a fiber 842, which may correspond to the fiber 112 of FIG. 1, the fiber 206 of FIG. 2, the fiber 306 of FIG. 3, the fiber 402 of FIG. 4, and/or the fiber 502 of FIG. 5. The control system 846 may include components of the control units 102 described with reference to FIG. 1 and FIG. 2. The plurality of systems 820 may additionally include one or more of a propulsion system 824, an electrical system 826, an environmental system 828, or a hydraulic system 830. Any number of other systems may be included, such as a processor coupled to a memory (not shown). The processor may be configured to execute computer-executable instructions (e.g., a program of one or more instructions) stored in the memory. The instructions may include or correspond to instructions which when executed cause the processor to perform one or more operations of the methods of FIG. 6. Although an aerospace example is shown, the implementations described herein may be applied to other industries, such as the automotive industry.

Apparatus and methods included herein may be employed during any one or more of the stages of the method 700 of FIG. 7. For example, components or subassemblies corresponding to production process 708 may be fabricated or manufactured in a manner similar to components or subassemblies produced while the vehicle 802 is in service, at 712 for example and without limitation. Also, one or more apparatus implementations, method implementations, or a combination thereof may be utilized during the production stages (e.g., elements 702-710 of the method 700), for example, by substantially expediting assembly of or reducing the cost of the vehicle 802. Similarly, one or more of apparatus implementations, method implementations, or a combination thereof may be utilized while the vehicle 802 is in service, at 712 for example and without limitation, to maintenance and service, at 714.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A level sensor assembly comprising:
a fiber configured to be at least partially disposed in a tank and to be coupled to a light source and to a light detector, the fiber comprising:
   a plurality of sensing regions spaced apart along a length of the fiber, each sensing region of the plurality of sensing regions comprising:
      a Bragg grating configured to generate a reflection spectrum responsive to incident light; and
      a strain layer around the Bragg grating,
      wherein each strain layer is configured to induce a strain on the fiber at a respective Bragg grating based on a temperature of the strain layer such that shifts in the reflection spectra of the Bragg gratings indicate which of the sensing regions are submerged in a liquid.

2. The level sensor assembly of claim 1, wherein the strain layer includes a polymer layer.

3. The level sensor assembly of claim 1, wherein a coefficient of thermal expansion of the strain layer is different from a coefficient of thermal expansion of the fiber.

4. The level sensor assembly of claim 1, wherein the fiber further comprises a plurality of spacer regions, wherein a spacer region of the plurality of spacer regions is disposed between each pair of adjacent sensing regions, and wherein the spacer region does not include a strain layer.

5. The level sensor assembly of claim 1, wherein a first sensing region of the plurality of sensing regions includes a first Bragg grating configured to generate, under reference conditions, a first reflection spectrum having a first reflection peak at a first wavelength and a second sensing region of the plurality of sensing regions includes a second Bragg grating configured to generate, under the reference conditions, a second reflection spectrum having a second reflection peak at a second wavelength, the first wavelength different from the second wavelength.

6. A level sensor system comprising:
a fiber comprising:
   a plurality of Bragg gratings defined along a length of the fiber; and
   a strain layer around each Bragg grating of the plurality of Bragg gratings, wherein the strain layer is configured to induce a strain on the fiber at a respective Bragg grating, the strain based on a temperature of the strain layer;
a light source coupled to the fiber to cause incident light to propagate along the fiber;
a light detector coupled to the fiber; and
a control system coupled to the light detector, the control system configured to:
   receive a signal from the light detector, the signal indicating a detected light spectrum detected by the light detector, wherein the detected light spectrum differs from a spectrum of the incident light due to reflection characteristics of the plurality of Bragg gratings;
   compare the detected light spectrum to a reference spectrum to detect a shift in a reflection spectrum of at least one Bragg grating of the plurality of Bragg gratings; and
   determine a level of liquid in a tank based on the shift.

7. The level sensor system of claim 6, wherein the tank is a component of a vehicle.

8. The level sensor system of claim 6, wherein the control system includes a memory to store calibration data that associates reference reflection peaks of the reference spectrum of a particular Bragg grating with a position of the particular Bragg grating along the fiber, wherein compare the detected light spectrum to the reference spectrum comprises:
analyzing the detected light spectrum to identify a first reflection peak associated with a first Bragg grating;

determining, based on the first reflection peak and the reference spectrum, a first shift associated with the first Bragg grating;

analyzing the detected light spectrum to identify a second reflection peak associated with a second Bragg grating;

determining, based on the second reflection peak and the reference spectrum, a second shift associated with the first Bragg grating;

determining that the first shift indicates that the first Bragg grating is submerged; and determining that the second shift indicates that the second Bragg grating is not submerged, wherein the level of the liquid in the tank is determined based on the calibration data, the first shift, and the second shift.

9. The level sensor system of claim 6, further comprising a heat source coupled to the fiber and configured to heat at least the plurality of Bragg gratings.

10. The level sensor system of claim 6, further comprising a second fiber comprising a second plurality of Bragg gratings and second strain layers around Bragg gratings of the second plurality of Bragg gratings, wherein the control system is further configured to receive a second signal indicating a second detected light spectrum and to determine the level of the liquid in the tank based on the shift and based on a second shift associated with the second detected light spectrum.

11. The level sensor system of claim 10, wherein the fiber and the second fiber are coupled to the tank such that a first Bragg grating of the fiber is offset, in a direction along the length of the fiber, from a second Bragg grating of the second fiber.

12. The level sensor system of claim 6, wherein each Bragg grating of the plurality of Bragg gratings is configured to generate a respective reflection spectrum that is distinct from reflection spectra of other Bragg gratings of the plurality of Bragg gratings.

13. A containment system comprising:
a tank;
a fiber at least partially disposed within the tank, the fiber comprising:
a plurality of Bragg gratings defined along a length of the fiber; and
a strain layer around each Bragg grating of the plurality of Bragg gratings, wherein the strain layer is configured to induce a strain on the fiber at a respective Bragg grating, the strain based on a temperature of the strain layer; and
a control system coupled to the fiber and configured to determine a level of liquid in the tank based on a shift in a reflection spectrum of at least one Bragg grating of the plurality of Bragg gratings, the shift indicating whether a strain layer of the at least one Bragg grating is in contact with the liquid.

14. The containment system of claim 13, wherein the fiber is wrapped around an inner surface of a wall of the tank.

15. The containment system of claim 13, wherein the plurality of Bragg gratings includes a first Bragg grating and a second Bragg grating, wherein a first strain layer encircles the first Bragg grating and a second strain layer encircles the second Bragg grating, and wherein a portion of the fiber that does not have a strain layer is disposed between the first strain layer and the second strain layer.

16. The containment system of claim 15, further comprising a second fiber comprising a second plurality of Bragg gratings and second strain layers around Bragg gratings of the second plurality of Bragg gratings, wherein the control system is configured to determine the level of the liquid in the tank further based on a second shift in a reflection spectrum of at least one Bragg grating of the second plurality of Bragg gratings.

17. The containment system of claim 13, wherein the liquid is a cryogenically cooled liquid.

18. The containment system of claim 13, wherein the liquid includes liquid hydrogen.

19. The containment system of claim 13, wherein a first Bragg grating of the plurality of Bragg gratings is configured to generate, under reference conditions, a first reflection spectrum having a first reflection peak at a first wavelength and a second Bragg grating of the plurality of Bragg gratings is configured to generate, under the reference conditions, a second reflection spectrum having a second reflection peak at a second wavelength, the first wavelength different from the second wavelength.

20. The containment system of claim 19, wherein the control system include a memory to store calibration data that associates the first Bragg grating within a first liquid level in the tank and that associates the second Bragg grating within a second liquid level in the tank, wherein the control system is configured to:
analyze a light spectrum reflected from the fiber responsive to incident light;
determine, based on the light spectrum reflected from the fiber, a first shifted reflection peak associated with the first Bragg grating and a second shifted reflection peak associated with the second Bragg grating; and
responsive to a determination, based on the first shifted reflection peak, that a first strain layer of the first Bragg grating is not in contact with the liquid and a determination, based on the second shifted reflection peak, that a second strain layer of the second Bragg grating is in contact with the liquid, generate an output indicating that a liquid level in the tank is between the first liquid level and the second liquid level.

* * * * *